(No Model.) 2 Sheets—Sheet 1.
A. B. & W. S. STROWGER.
COMBINED INDICATING ELECTRIC SWITCH AND CURRENT REVERSER.
No. 492,850. Patented Mar. 7, 1893.
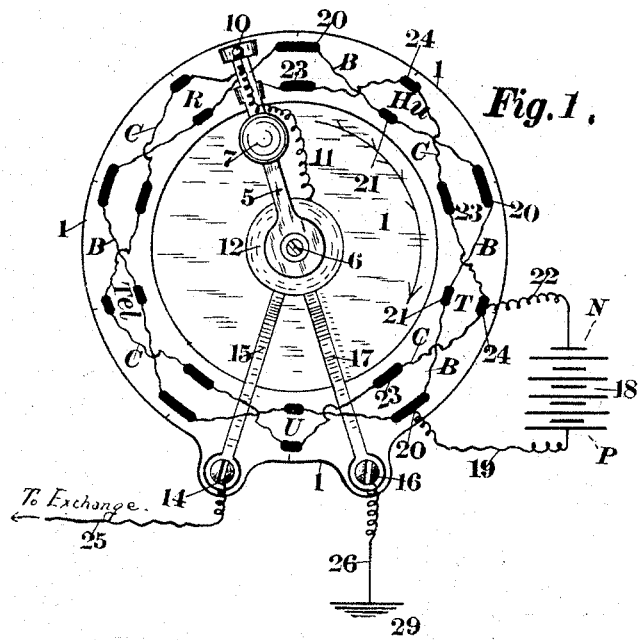
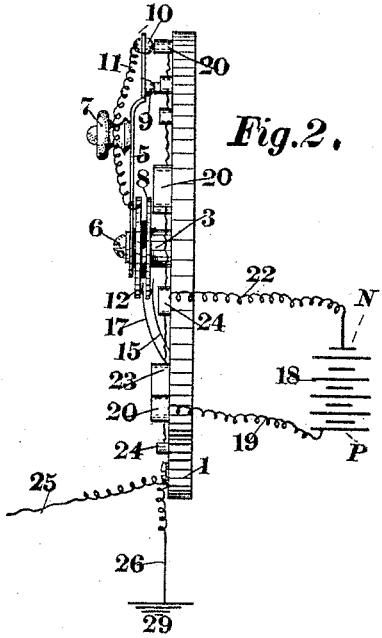
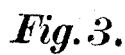 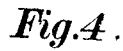
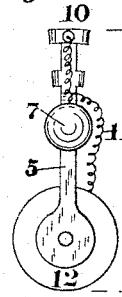 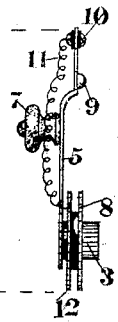
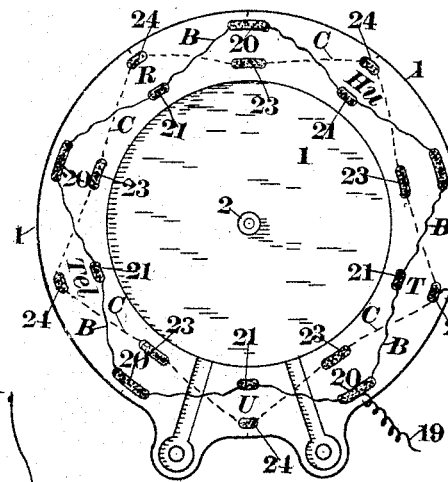 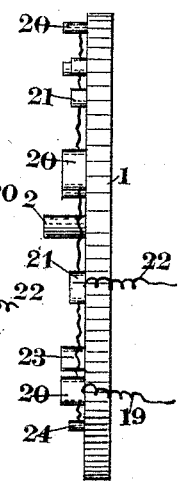
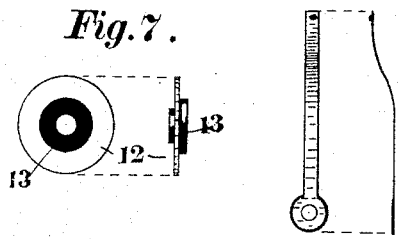
WITNESSES:
H. S. Brown
Wm. Upton
INVENTORS:
Almon B. Strowger
and Walter S. Strowger
per their atty. Oscar Snell

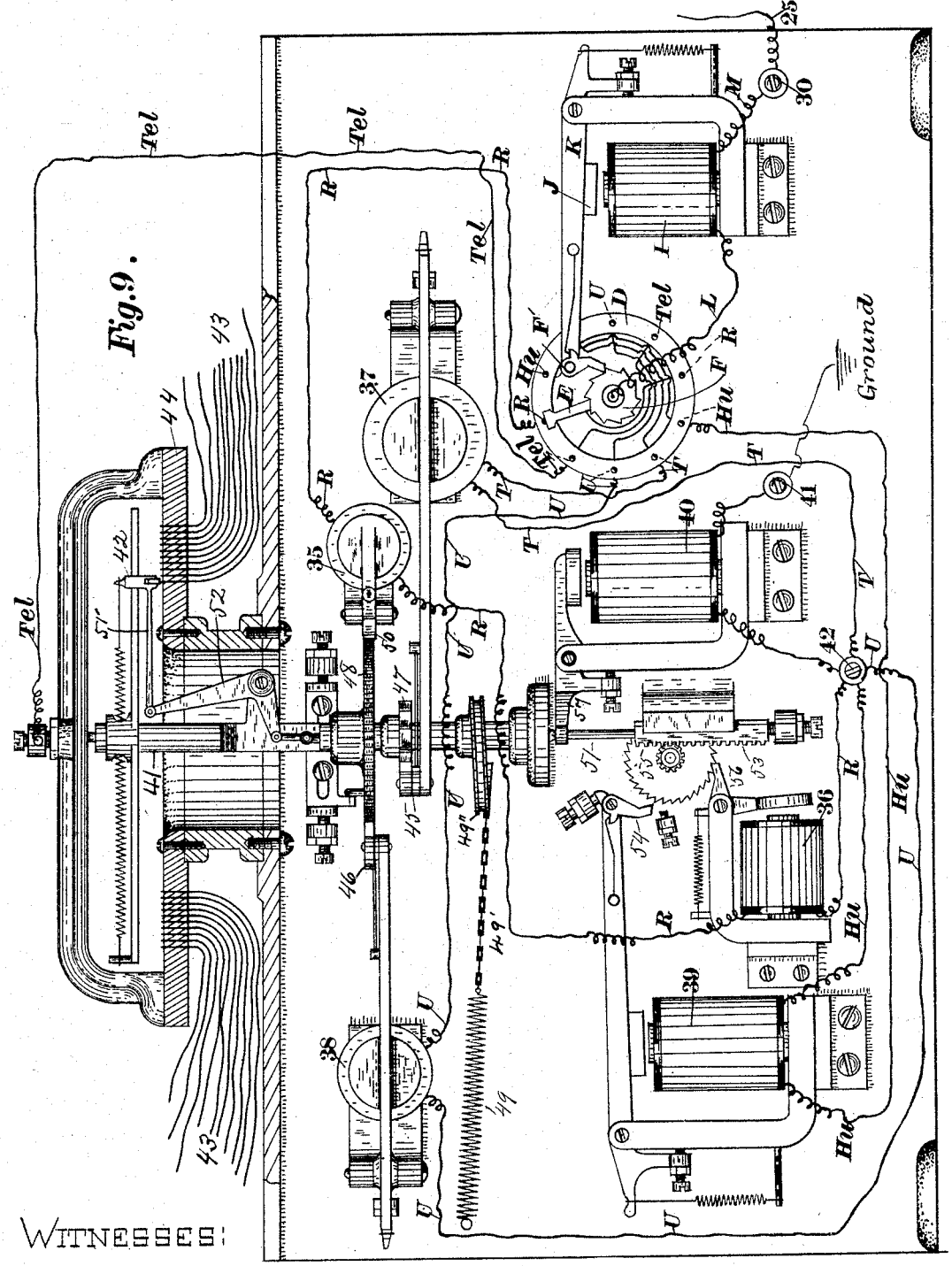

UNITED STATES PATENT OFFICE.

ALMON B. STROWGER AND WALTER S. STROWGER, OF CHICAGO, ILLINOIS, ASSIGNORS TO THE STROWGER AUTOMATIC TELEPHONE EXCHANGE, OF SAME PLACE.

COMBINED INDICATING ELECTRIC SWITCH AND CURRENT REVERSER.

SPECIFICATION forming part of Letters Patent No. 492,850, dated March 7, 1893.

Application filed February 19, 1892. Serial No. 422,156. (No model.)

*To all whom it may concern:*

Be it known that we, ALMON B. STROWGER and WALTER S. STROWGER, citizens of the United States, residing at Chicago, in the county of Cook and State of Illinois, have invented a new and useful Combined Indicating Electric Switch and Current Reverser, of which the following is a specification.

Our invention relates to switches and current reversers which control currents of electricity, which currents intermittently energize polarized electro-magnets for the general purpose hereinafter set forth.

One of our objects is to provide means by which the number of line wires required to operate electrical and other exchanges can be reduced to the least number possible, which means includes the introduction of oppositely polarized electro-magnets which serve to operate the mechanism of said exchanges in combination with a means by which the positive and negative currents of electricity, respectively, from and to an electric battery, are automatically reversed when being controlled to operate said magnets as will be fully explained hereinafter; these objects being attained by the mechanism illustrated in the accompanying drawings, in which—

Figure 1 is a front elevation of one of the principal parts of the combination necessary to form our new combined indicating electric switch and current reversing key, together with a connected electric battery. Fig. 2 is a side elevation of Fig. 1. Fig. 3 is a front elevation of the switch and electric current reversing key, detached from Fig. 1. Fig. 4 is a side elevation of Fig. 3. Fig. 5 is a front elevation of the switch dial or base to which the several operative parts of Fig. 1 are attached, the key, Fig. 3, and several other parts being removed to show plainly the method of making electrical connections. Fig. 6 is a side elevation of Fig. 5. Fig. 7, respectively, face and edge views of a contact disk from Fig. 3, to show insulating material at center. Fig. 8 are, respectively, front and edge views of spring contact brushes for conveying the electric currents to and from key Figs. 1 and 3. Fig. 9 is an electrical exchange of the general construction embodied in an application Serial No 416,023 for a patent of the United States, filed by Almon B. Strowger, of Chicago, Illinois, of even date with this application, with the exception that all the electro-magnets shown in Fig. 9, in the present application for patent, are polarized, one magnet of the number shown being of opposite polarity to the others, which will be explained. Fig. 9 also shows an auxiliary switch which is operated in combination with the mechanism shown in Fig. 1, and is inseparable from it in the switching operations necessary to operate the electrical exchange shown, by means of currents over but one line wire for both switching and telephonic purposes.

Similar figures and letters designate like parts throughout the several views.

Since in manipulating this system of transmitting and utilizing currents of electricity for the purpose stated the work is always done at a station where is located the mechanism embodied in Fig. 1 we will proceed to describe its several parts and then show their relation to the mechanism of Fig. 9.

In Fig. 1 is a dial 1 made of some insulating substance similar to gutta percha. Figs. 5 and 6 show a stud pin 2 which projects outward from the central portion of the dial and which pin serves as a journal or pivotal center upon which is mounted and revolves hub 3 of key 5, a screw 6, Figs. 1, and 2, being screwed into the outer end of the pin and serving to hold the hub in position on the pin, when key 5 is revolved by the operator's fingers around the dial in direction indicated by the arrow, the operator's fingers grasping thumb knob 7, which is made of an insulating material. The key 5 is of metal, and is firmly secured to hub 3. There is a contact disk 8, which is firmly secured to hub 3 so that disk 8 and key 5 are in electrical communication with each other.

At 9 is a metal knob which forms a contact point for key 5.

At 10 is a metal knob secured to the outer end of key 5, but is electrically insulated from the key, and this knob 10 is connected by wire 11 to disk 12, Fig. 7, which disk is between disk 8 and key 5, disk 12 being secured to hub 3 by means of insulating material 13. Disk 8 is connected electrically to binding screw 14 by means of spring brush 15, and disk 12 is connected electrically with binding screw 16 by means of spring brush 17, both of these brushes bearing against the disks and not attached thereto, and making a rubbing contact when the disks are revolved. An electric battery 18 has its positive pole P connected by wire 19 to a wire B, which is connected to a series of metal contact heads 20 and 21 which heads have their bases firmly secured in the face of the dial 1, the outer ends of the contact heads being above the face of the dial. It will be noticed that contacts 20 are longer than 21, Fig. 6. Contact heads 21 are nearer the center of dial 1 than long contact heads 20, so that connecting wire B forms a ziz-zag around the rim face of the dial. Contact heads 23 and 24 are all connected in one circuit by wire C, which wire is connected to the negative side N of battery 18 by wire 22. The connected heads 23 and 24 are not of the same height above dial 1. Heads 20 and 23 are high and form a pair, each head transmitting an electric current opposite to the other in polarity. For convenience of description we will number these pairs of high contact heads 20—23. Short contact heads 21 and 24 also form pairs, each head transmitting an electric current opposite to the other in polarity, and these heads 21 and 24, in pairs we will designate 21—24. Fig. 5 shows wire B in solid lines, and wire C in dotted lines, to illustrate more clearly, than is shown in Fig. 1, the course of these wires around dial 1, and their connection with the several contact heads so that the relative positions of these heads in the pairs for the positive and negative side of the battery are successively reversed all around the circle of dial 1.

Attached to binding screw 14 is the line wire 25 which is connected to the exchange, Fig. 9, and this wire carries currents of electricity controlled by and reversed by key 5, Fig. 3. Wire 26 from binding screw 16 leads to ground at 29.

In Fig. 9 is an auxiliary switch consisting of a dial D, around which revolves a switch arm E, the end of the switch arm contacting with heads of metal which are insulated from each other when secured to dial D. Each of these heads is connected to the head diametrically opposite of dial D by a wire forming an electric connection. On one side of dial D five of these heads are connected to wires which are designated, respectively, beginning at the bottom of dial D—Hu, T, U, Tel and R, because these wires carry currents of electricity directly to the magnets which respectively operate the hundreds, tens, units, telephone and release mechanism in the system of telephone exchange shown. The switch arm E is attached to and moves with a ratchet wheel F, which wheel has ten teeth, in this instance, and is revolved on a stationary pin by means of successive thrusts of pawl F′ operated by magnet I through the medium of armature J, and lever K, causing the outer end of arm E to successively and intermittently contact each of the insulated heads around dial D. Although the wheel F is provided with ten teeth, it is only necessary to use half of them as the heads on the dial are connected in pairs, upon opposite sides of the dial, so that it is only necessary to move the arm E half way round the dial to establish communication with all of the wires leading from the switch to the apparatus for operating the contact point of the exchange. Binding screw 30 is connected electrically to arm E by wire M passing through the coils of magnet I, thence by wire L to the center of motion of arm E.

In Fig. 9 magnets 35, 36, 37, 38, 39, and 40 are all similarly polarized so as to be capable of being energized by a positive current of electricity which current passes through the coils of magnet I without energizing the same on account of its polarity being opposite to that of the other magnets above mentioned.

The switch dial Fig. 1 has five double contacts which are marked, successively and respectively, Hu, T, U, Tel and R which designations register with the five pairs of short contact heads 21—24, plainly shown in Figs. 1 and 5.

It will be understood that the combination of dial 1, Fig. 1, and dial D, Fig. 9, with switch arm E moving around dial D in unison with the successive intermittent movements of key 5 of dial 1—forms an indicating switch mechanism, so that the operator at dial 1 always knows exactly the wire which switch arm E is in communication with by the position of key 5 on dial 1.

In the form of electrical exchange shown in Fig. 9, which however is only shown for the purpose of illustrating one form of mechanism to which our current reverser is applicable, and not for the purpose of limiting ourselves to it as the only form to which the reverser is applicable, 41 indicates a centrally located post which is rotatable upon its axis, and movable longitudinally to a slight extent, and is provided at its upper end with a movable contact head 42, which is adapted to be brought into contact with any one of the ends of the wires 43 in the table 44. This post is rotated upon its axis in one direction by means of the pawls 45 and 46 which engage with the ratchet wheels 47 and 48 respectively and are operated by the magnets 37 and 38 respectively. The wheel 48 is of a greater diameter and has more teeth than the wheel 47 whereby the post is rotated a greater distance by one thrust of the pawl 45 than when operated by one thrust of the pawl 46. This is for the purpose of saving time in the rotation of the post, as the smaller ratchet wheel is operated for moving the contact head, as for instance over ten wire ends for each thrust of the pawl, and the other wheel will only move it over one end. The post is rotated in the opposite direction by a spring 49 chain 49' and sheave 49'' as soon as the pawl 50 is disengaged from the ratchet wheel 48 by the magnet 35. The contact head 42 is moved radially from the post by means of a longitudinally movable rod 51, a bar 51' and an angle lever 52. The rod 51 is moved upward by means of a rack gear 53 which is operated by the pawl 54 and the ratchet wheel 55, the pawl being operated by the magnet 39. The rod is held in its elevated position by the pawl 56 which engages with the ratchet wheel 55 and which can be released therefrom by the magnet 36 which will permit the rod to fall and thus move the contact head 42 back to its original position. The post 41 is moved longitudinally to prevent its contact head 42 from coming in contact with the ends of the wires while it is being moved from one wire end to the other by a lever 57 which engages with the lower end of the post and is swung upon its pivot by the magnet 40. After all the electrical connections are made with dial 1 from battery 18, and ground 29, and wire 25 is connected to binding screw 30, Fig. 9, should key 5 be turned as a crank around dial 1, from left to right, see arrow, the contact points 9 and 10, near the end of key 5, would successively and simultaneously strike the top surface of each one of each pair of long contact heads 20—23, but the contact points 9 and 10 would not strike contact heads 24—21 on account of their top surfaces being below the plane of revolution of key 5; and the top line of surface of contacts heads 20—23. Suppose key 5 is in the position shown in Fig. 1; the contact points 9 and 10 are out of contact with the heads on dial 1. If key 5 is turned to the right, direction of arrow, until contact points 9 and 10 strike contact pair 20—23, at the top of the dial Fig. 1, a negative current of electricity will pass from binding screw 41, Fig. 9, (which binder is connected with the ground) thence by wire to and through the coils of magnet 40, thence to binding screw 42, thence by wire R to and through the coils of magnet 36, thence by wire R to and through the coils of magnet 35, thence by wire R to contact head R of dial D, thence by switch arm E and wire L and through the coils of magnet I, thence by wire M to binding screw 30, thence by line wire 25 to binding screw 14, Fig. 1, thence through brush 15 to disk 8, key 5, contact point 9, contact head 23 thence by wire C to and through wire 22 into the negative side N of battery 18, thence by wire 19 to wire B, of dial 1, thence by head 20 into insulated point 10 of key 5, thence by wire 11, disk 12, and brush 17 to binding screw 16, wire 26 and to ground 29. During the passage of this negative current only magnet I Fig. 9 is energized, which causes pawl F of lever K to turn ratchet wheel F the pitch of one tooth thereof, causing switch arm E to move in the direction of the hands of a watch and contact the next contact head of dial D. Should key 5 be revolved entirely around dial 1, each time its contact points strike contact heads 20—23 a negative current will pass through the coils of magnet I toward battery 18 in the manner described when the several parts of the mechanism have the relative positions as shown and described, each time magnet I is energized causing arm E to move forward and contact the next succeeding contact head of dial D Fig. 9, the movement of arm E being practically simultaneous with the movement of key 5, so that arm E is at all times in the same relative position, as to contact points at dial D, as key 5 is at dial 1.

We have shown the course taken by a negative current of electricity when serving to energize magnet I of the auxiliary switch of Fig. 9, and now we will describe the means by which the electric current is reversed at dial 1, Fig. 1, so that a positive current is conducted from battery 18 through line wire 25, then shunted to any one or more of the magnets separately, of the operative mechanism of the exchange Fig. 9. After key 5 has been turned over and out of contact with heads 20—23, at the top of dial 1, and switch arm E has moved to the next succeeding contact head on dial D it will be found that a current of electricity can pass from line wire 25 to the "hundreds" magnet 39 of Fig. 9. If key 5 is stopped in its movement directly over the pair of contact heads 21—24 which heads have Hu between them, Fig. 1, a positive current from battery 18 can be sent through to "hundreds" magnet 39 by pressing against the top of insulated knob 7 the outer end of key 5 will be bent inward toward dial 1 and contact points 9 and 10 will strike against contact heads 21—24, when a current of electricity from the positive side of battery 18 will pass through wire 19, wire B and contact head 21, thence to contact point 9, key 5, disk 8, brush 15, binding screw 14 and thence through line wire 25 to binding screw 30, Fig. 9, thence through the coils of magnet I, without energizing said magnet, thence by wire L, switch arm E, contact head Hu, thence by wire Hu to and through the coils of magnet 39 (which is energized), thence to binding screw 42 thence through the coils of magnet 40, thence to the ground by connected binding screw 41. Key 5 is pressed down with points 9 and 10 in contact with 21—24 at Hu as many times as it is necessary to operate the "hundreds" mechanism of the exchange.

In case the "tens" mechanism of the exchange is to be operated, a further movement of key 5 around dial 1 from Hu, direction of arrow, will cause contact points 9 and 10 of key 5 to contact the next pair of heads 20—23 which will set switch arm, E Fig. 9, to T or "tens;" after which key 5 is turned to stand over contact heads 21—24, having T between them, when key 5 is pressed down with the points 9 and 10 in contact with heads 21—24, as many times as is desired for the required number of tens, and so on, for "units" "telephone" and "release."

Having thus described our invention, we claim—

1. A combined indicator switch and current reverser consisting of an indicator, a series of pairs of contact heads, the heads of each pair being adapted to be connected with the opposite poles of a battery, and a switch movable over said heads and adapted to be brought into contact therewith and provided with means for reversing the current, substantially as set forth.

2. A combined indicator switch and current reverser consisting of a dial, an annularly series of pairs of contact heads secured thereto, the heads of each pair being adapted to be connected with the heads of the other pairs and with the opposite poles of a battery, and a switch pivotally secured at the center of said dial and series of heads, and provided with means for reversing the current, substantially as set forth.

3. A combined indicator switch and current reverser consisting of a dial, two rows of contact heads arranged in pairs, the heads of each pair being adapted to be connected with the heads of the other pairs and with the opposite poles of a battery, the polarity of the heads of each row alternating with each other, and a switch movable over said heads and adapted to be brought into electrical connection therewith, whereby a current may be passed in either direction through the heads and their connections, substantially as set forth.

4. In a combined indicator switch and current reverser, the combination with an electrical battery, a series of pairs of contact heads secured thereto and arranged in two circles around the dial, the heads of each pair being connected with the opposite poles of the battery, and the polarity of the heads of each row alternating with each other, two wires second to the dial, one of which is a ground wire, and the other one is a working wire, a switch pivotally secured at the center of the rows of heads provided with two insulated contact points, each of which connects with the central portion of the dial, and an electrical connection between each of the contact points of the switch and each of the wires secured to the dial, substantially as set forth.

5. The combination with an automatic electrical exchange provided with a series of magnets of one polarity, of a switch connected therewith, said switch being provided with contact heads electrically connected in pairs, an arm for engaging said heads, a magnet electrically connected with said arms of a different polarity from the other magnets, and means for passing different currents through said magnets and switch, substantially as set forth.

6. The combination with an automatic electrical exchange provided with a series of magnets of one polarity, of a switch connected therewith having contact heads electrically connected in pairs, an arm for engaging with said heads a magnet electrically connected with said arm of a different polarity from the other magnets, and a current reverser for passing different currents through said magnets and switch, said reverser having as many reverse contact points as there are pairs of heads upon the switch, substantially as set forth.

In testimony that we claim the foregoing we have hereunto set our hands, this 5th day of February, 1892, in the presence of witnesses.

ALMON B. STROWGER.
WALTER S. STROWGER.

Witnesses:
F. L. BARNETT,
OSCAR SNELL.